United States Patent
Niu et al.

(10) Patent No.: US 9,489,068 B2
(45) Date of Patent: Nov. 8, 2016

(54) METHODS AND APPARATUS FOR PREVENTING ACCIDENTAL TOUCH OPERATION

(71) Applicant: Beijing Xiaomi Technology Co., Ltd., Beijing (CN)

(72) Inventors: Kun Niu, Beijing (CN); Xinyu Liu, Beijing (CN); Zhongliang Qiao, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 89 days.

(21) Appl. No.: 13/957,882

(22) Filed: Aug. 2, 2013

(65) Prior Publication Data

US 2014/0049494 A1    Feb. 20, 2014

(30) Foreign Application Priority Data

Aug. 17, 2012  (CN) .......................... 2012 1 0295655

(51) Int. Cl.
G06F 3/041   (2006.01)
G06F 3/0488  (2013.01)

(52) U.S. Cl.
CPC ............. *G06F 3/041* (2013.01); *G06F 3/0416* (2013.01); *G06F 3/0418* (2013.01); *G06F 3/0488* (2013.01)

(58) Field of Classification Search
USPC ........................................................ 345/173
See application file for complete search history.

(56) References Cited

U.S. PATENT DOCUMENTS

2009/0153438 A1* 6/2009 Miller .................. G06F 3/0488
                                                        345/55
2009/0174679 A1* 7/2009 Westerman ......... G06F 3/03547
                                                       345/173

(Continued)

FOREIGN PATENT DOCUMENTS

CN       102314308 A      1/2012
CN       102346596        2/2012

(Continued)

OTHER PUBLICATIONS

European Search Examination for EP13829316.2 dated Aug. 1, 2016 for related matter.

(Continued)

*Primary Examiner* — Quan-Zhen Wang
*Assistant Examiner* — Nathan Brittingham
(74) *Attorney, Agent, or Firm* — Young Basile Hanlon & MacFarlane, P.C.

(57) ABSTRACT

Method and apparatus for preventing an accidental touch operation. The method includes determining, when detecting a touch point in a display area on a touch screen, whether the touch point is within an invalid touch area based on the detected touch point in the display area; and making a response to the touch point only if it is determined that the touch point is not within the invalid touch area. If it is determined that the touch point is within the invalid touch area, no response to the touch point is made.

17 Claims, 3 Drawing Sheets

(56) References Cited

U.S. PATENT DOCUMENTS

| | | | |
|---|---|---|---|
| 2009/0184935 A1* | 7/2009 | Kim | G06F 3/0416 345/173 |
| 2010/0156795 A1* | 6/2010 | Kim | G06F 3/044 345/168 |
| 2011/0285645 A1* | 11/2011 | Cho | G06F 3/0416 345/173 |
| 2011/0316807 A1* | 12/2011 | Corrion | G06F 3/0416 345/174 |
| 2012/0001861 A1* | 1/2012 | Townsend | G06F 3/0416 345/173 |
| 2012/0011438 A1* | 1/2012 | Kim | G06F 1/1626 715/702 |
| 2012/0038572 A1* | 2/2012 | Kim | G06F 3/0418 345/173 |
| 2012/0075212 A1* | 3/2012 | Park | G06F 3/04886 345/173 |
| 2012/0206330 A1* | 8/2012 | Cao | G06F 3/0383 345/156 |
| 2012/0262407 A1* | 10/2012 | Hinckley | G06F 3/038 345/173 |
| 2013/0069886 A1* | 3/2013 | Wang | G06F 3/044 345/173 |
| 2013/0088445 A1* | 4/2013 | Kang | G06F 3/041 345/173 |
| 2013/0181902 A1* | 7/2013 | Hinckley | G06F 1/1684 345/168 |
| 2013/0246861 A1* | 9/2013 | Colley | G06F 3/0488 714/48 |
| 2013/0300672 A1* | 11/2013 | Griffin | G06F 3/04883 345/173 |
| 2014/0049494 A1* | 2/2014 | Niu | G06F 3/0488 345/173 |
| 2014/0125612 A1* | 5/2014 | Park | G06F 3/0416 345/173 |
| 2014/0232676 A1* | 8/2014 | Shimizu | 345/173 |

FOREIGN PATENT DOCUMENTS

| | | |
|---|---|---|
| CN | 102375579 A | 3/2012 |
| CN | 102375682 A | 3/2012 |
| CN | 102375684 A | 3/2012 |
| CN | 102419687 A | 4/2012 |
| CN | 102830844 A | 12/2012 |
| CN | 103186269 A | 7/2013 |
| EP | 2077490 A2 | 7/2009 |
| EP | 2434385 A2 | 3/2012 |
| JP | 2006244154 A | 9/2006 |
| JP | 2008033120 A | 2/2008 |
| JP | 2009080683 A | 4/2009 |
| JP | 2009217814 A | 9/2009 |
| JP | 2010272037 A | 12/2010 |
| JP | 2011186941 A | 9/2011 |
| JP | 2012043180 A | 3/2012 |
| KR | 1020120031806 | 4/2012 |
| RU | 2008128215 A | 1/2010 |
| WO | 2010/090033 A1 | 8/2010 |

OTHER PUBLICATIONS

Japanese Office Action—Rejection from related matter JP2015-516449, mailed Jan. 27, 2016, 3 pages.

* cited by examiner

METHODS AND APPARATUS FOR PREVENTING ACCIDENTAL TOUCH OPERATION

RELATED APPLICATIONS

This application is based upon and claims the benefit of priority from Chinese Patent Application No. CN201210295655.7, filed Aug. 17, 2012, the entire contents of which are incorporated herein by reference.

TECHNICAL FIELD

The present disclosure generally relates to the field of touch screen technologies, and more particularly to method and apparatus of preventing an accidental touch operation.

BACKGROUND

With the development of science and technology, a mobile phone is becoming increasingly integrated with more functionalities. Meanwhile, mobile phones tend to have larger touch screens as well as thinner frames. When the frame of a mobile phone is thin, a user is likely to touch an edge of a mobile phone screen when holding the mobile phone, thereby causing an accidental operation.

SUMMARY

Disclosed herein are implementations of systems, methods, and apparatuses for preventing an accidental touch operation.

In one aspect of the present disclosure, a method for preventing an accidental touch operation includes: when detecting a touch point in a display area on a touch screen, determining whether the touch point is within an invalid touch area based on the detected touch point in the display area; and making a response to the touch point only if it is determined that the touch point is not within the invalid touch area. If it is determined that the touch point is within the invalid touch area, no response to the touch point is made.

In another aspect of the present disclosure, an apparatus includes a memory and a processor configured to execute instructions stored in the memory to detect a touch point in a display area on a touch screen associated with the apparatus; determine whether the touch point is within an invalid touch area based on the detected touch point in the display area; and make a response to the touch point only if it is determined that the touch point is not within the invalid touch area. If it is determined that the touch point is within the invalid touch area, no response to the touch point is made.

In another aspect, the present disclosure includes a non-transitory computer-readable medium having stored thereon a program of instructions executable by one or more computing devices to detect a touch point in a display area on a touch screen associated with the one or more computing devices; determine whether the touch point is within an invalid touch area based on the detected touch point in the display area; and make a response to the touch point only if it is determined that the touch point is not within the invalid touch area. If it is determined that the touch point is within the invalid touch area, no response to the touch point is made.

The present disclosure is further described below in details through the drawings and implementations.

BRIEF DESCRIPTION OF THE DRAWINGS

The drawings are used to provide further understanding about the present disclosure, constituting part of the description, and are used together with the implementations of the present disclosure to explain the present invention, and do not constitute any limitation to the present disclosure.

DETAILED DESCRIPTION

The technical solution of the present disclosure is further described below through implementations taken in conjunction with the accompanying drawings. Specific implementations, implementations or examples of the method for preventing an accidental touch operation, the touch screen, and the mobile terminal are further described in detail below with reference to the accompanying drawings and specific implementations.

A call may be accidentally made when a user holds a mobile phone by the mobile phone frame even when the user does not want to make a call. Similar problems exist for a Short Message Service (SMS) interface, an application program interface, and the like. Techniques such as locking a mobile phone screen have been used to avoid the accidental operation. However, screen locking requires the user to lock the screen timely. It also requires the user to unlock when performing an operation on the mobile phone interface, which increases the operation complexity for the user. In addition, if the user forgets to lock the screen, the accidental operation may still be triggered.

The implementations of the present disclosure include method and apparatus for preventing an accidental touch operation to improve the accuracy and validity of a touch response on a touch screen, thereby preventing the problem of performing a function improperly resulted from an accidental touch on the screen.

Figure 1:
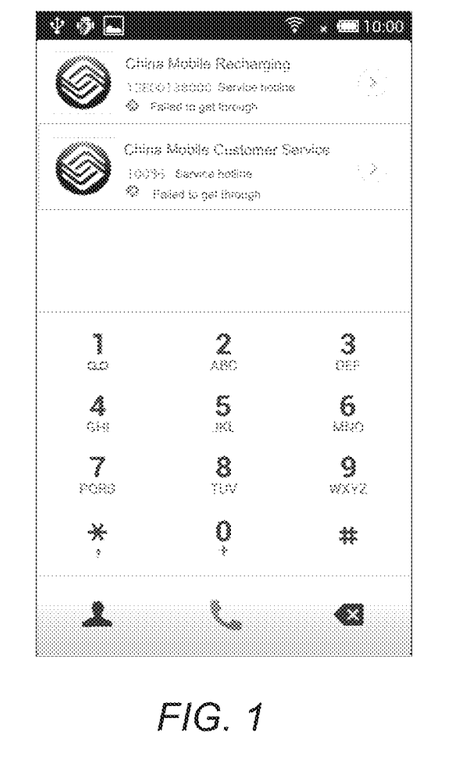
FIG. 1 is a call record interface of a mobile phone.

FIG. 1 shows an example of a call record interface of a mobile phone. In the interface, each entry corresponds to an area for displaying the entry in the touch screen. For example, when a user touches a display area corresponding to an entry, a function such as a function of making a corresponding call may be triggered. In other words, a corresponding function may be triggered by touching the display area of the entry. However, because the display area of an entry often extends to edges of the touch screen, edge areas of the touch screen are likely to be touched by the user accidentally, especially when the frame is thin.

Figure 2:
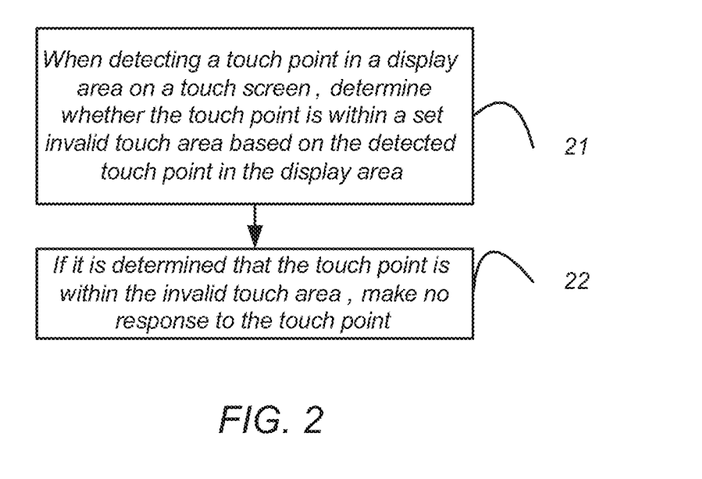
FIG. 2 is a schematic flowchart of a method for preventing an accidental touch operation according to an implementation of the present disclosure.

FIG. 2 illustrates an implementation of a method for preventing an accidental touch operation according to the present disclosure. As shown in FIG. 2, the method includes the following steps.

At a step 21, when detecting a touch point in a display area on a touch screen, it is determined whether the touch point is within an invalid touch area.

For example, a touch screen is a screen having functions of displaying an image and receiving a touch signal to trigger a corresponding function. In this step, when a touch point is detected on a touch screen, it is further detected whether the touch point is within an invalid touch area, where the invalid touch area is an area which is frequently touched by an accidental operation on the touch screen.

At a step 22, if it is determined that the touch point is within the invalid touch area, no response to the touch point is made. In other words, a response is made to the touch point only if it is determined that the touch point is not within the invalid touch area.

In some implementations of step 22, the set invalid touch area makes no response to a touch operation. That is, when it is determined that a touch point is within the invalid touch area, the touch is determined as a touch of an accidental operation, and a function corresponding to the invalid touch area is not triggered.

The method for preventing an accidental touch operation provided by the implementation, by using a method of making no response to a touch point when the touch point is within an invalid touch area, may avoid the problem of triggering a corresponding function improperly when a user touches the invalid touch area, thereby improving the accuracy and validity of touch effects for a touch screen.

In some implementations, the invalid touch area is a display area that is set in advance on a touch screen.

For example, a user may, according to actual requirements, determine an area in advance that is frequently touched in cases where a touch screen is operated properly (that is, cases where the touch screen is not operated accidentally), and an area that is frequently touched in cases where the touch screen is operated accidentally; and set the area that is frequently touched in cases where the touch screen is operated properly as a valid touch area, and the area that is frequently touched in cases where the touch screen is operated accidentally as an invalid touch area.

Further, the invalid touch area can be set to not respond to a touch operation, and the valid touch area is set to respond to a touch operation. That is, when it is determined that a touch point is within the invalid touch area, the touch is determined as a touch of an accidental operation, and a function corresponding to the invalid touch area is not triggered. When it is determined that a touch point is within the valid touch area, the touch is determined as a touch of a proper operation, and a function corresponding to the valid touch area is triggered.

In addition, in the method of the present disclosure, the invalid touch area, besides being set in advance by a user according to actual requirements, may also be a specific area in a touch screen set in advance by a system by default. That is, the system sets in advance a specific invalid touch area as a default option, and the user may select to use the default invalid touch area of the system, or set an invalid touch area according to actual requirements.

Regardless of whether the default invalid touch area of the system or the invalid touch area set in advance by the user according to actual requirements is used, the problem of triggering a corresponding function improperly when the user touches the invalid touch area may be avoided, thereby improving the accuracy and validity of touch effects of the touch screen. Compared to screen locking, the method of the present disclosure is simple and convenient to operate, and the function of preventing an accidental operation may be implemented by performing a setting step only once, so that the user may perform operations conveniently and quickly, thereby improving user experience.

In some implementations, the invalid touch area is a display area that is set in advance on a touch screen, which specifically includes setting in advance an invalid touch area with respect to an area of the touch screen for displaying a predetermined image.

In some implementations, images displayed on a touch screen can vary with corresponding functions. An area that is frequently touched when performing a proper operation for one graphic interface may be an area that may be touched when an operation is performed accidentally for another graphic interface. Therefore, the implementations of the present disclosure can set a corresponding invalid touch area with respect to a predetermined graphic interface according to actual requirements. That is, when the touch screen displays the predetermined graphic interface, if a touch point occurs within the invalid touch area that is set for the graphic interface, a function corresponding to the predetermined graphic interface will not be triggered. It should be noted that the predetermined graphic interface may be the interface of the entire touch screen or an area that displays only a predetermined image in the entire touch screen.

In some implementations, setting in advance the invalid touch area with respect to the area of the touch screen that displays the predetermined image can include, with respect to the area of the touch screen that displays the predetermined image, setting in advance an area that is away from edges of the touch screen by a specified width as the invalid touch area.

In some implementations, when an area of the touch screen for displaying the predetermined image extends to edges of the touch screen, especially when a frame of the mobile phone is thin, a user is likely to touch the area at the edges of the touch screen when holding the frame of the mobile phone, thereby triggering a function due to the accidental operation. To avoid this, the implementation of the present disclosure may, according to the actual situation when the touch screen displays the predetermined image, determine the area that is located at edges of the touch screen that is frequently touched accidentally thereby triggering a corresponding function, and set the area that is located at the edges as an invalid touch area.

In some implementations, a width may be set, and an area that is away from the edges of the touch screen by the width is determined as the invalid touch area. In addition, according to the actual situation, the touch screen may be designed with an invalid touch area close to four edges, or the touch screen may be designed with invalid touch areas at only two adjacent edges or two opposite edges.

For example, a user may input a set width value by interface input. Then, software on the background can set an area that is away from edges of the touch screen by the width value as an invalid touch area. Alternatively, the user may, by dragging a rectangular icon, determine an area that is away from edges of the touch screen by the set width value, and set it as an invalid touch area.

In some implementations, in the above method, setting in advance the invalid touch area with respect to the area of the touch screen that displays the predetermined image specifically includes, with respect to the area of the touch screen that displays the predetermined image, setting in advance an area that has a specified length and width from a specified position as the invalid touch area.

In some implementations, when the touch screen displays the predetermined image, according a common touch area of accidental operations, an area having specified length and width from a specified position in the area of the touch screen that displays the predetermined image may be set as the invalid touch area. Compared with the method of setting an area that is away from the edges of the touch screen by a specified width as the invalid touch area, this method is capable of locating the invalid touch area more accurately.

For example, a user can input specified coordinates, a specified length value, and a specified width value by interface input. Then, software on the background sets a corresponding area in the touch screen as the invalid touch area according to the input values. Alternatively, the user may determine an area in the touch screen and set it as the invalid touch area by dragging a rectangular icon.

In some implementations, when the invalid touch area is set in advance with respect to an area of the touch screen that displays a predetermined image, determining whether the touch point is within the set invalid touch area in step 21 specifically includes: when the touch screen displays the predetermined image, determining whether the touch point is within the invalid touch area that is set in advance with respect to the area of the touch screen that displays the predetermined image.

In some implementations, after the corresponding invalid touch area is set with respect to the predetermined image, it is very possible that different predetermined images have different invalid touch areas. Therefore, when detecting whether the touch point is within the invalid touch area that is set in advance in step 21, whether the touch point is within the corresponding invalid touch area should be detected with respect to the different predetermined images displayed by the touch screen.

In some implementations, determining whether the touch point is within the set invalid touch area in step 21 specifically includes: when the touch screen displays the predetermined image, determining whether the touch point is within the invalid touch area that is set in advance with respect to the area of the touch screen that displays the predetermined image. Making no response to the touch point when it is determined that the touch point is within the invalid touch area in step 22 can specifically include: when the touch screen displays the predetermined image and when it is determined that the touch point is within the invalid touch area that is set in advance with respect to the area of the touch screen that displays the predetermined image, controlling not to trigger the function corresponding to the invalid touch area.

For example, the predetermined image can be associated with the invalid touch area that is set with respect to the predetermined image, and when it is determined that an interface displayed on the touch screen is the predetermined image, the associated invalid touch area may be immediately determined, and when it is determined that a touch point occurs within the associated invalid touch area, it is controlled not to trigger a corresponding function, that is, make no response to a touch operation.

Figure 3:
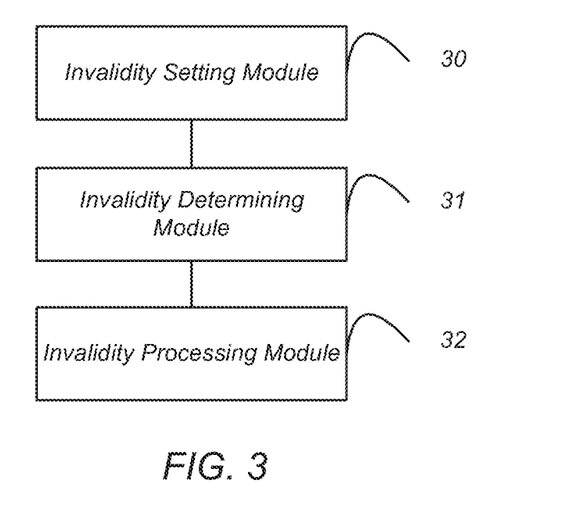
FIG. 3 is a schematic structural diagram of an apparatus according to an implementation of the present disclosure.

FIG. 3 shows an implementation of an apparatus (such as a touch screen device) for preventing an accidental touch operation provided by the method shown in FIG. 2. For example, the apparatus may include one or more of the following components: a processor (such as a CPU) configured to execute computer program instructions to perform various processes and methods, a memory (such as a random access memory (RAM) and read only memory (ROM)) configured to access and store information and computer program instructions, a touch screen configured to receive touch inputs from a user and display information, storage to store data and information, databases to store tables, lists or other data structures, I/O devices, antennas, etc.

In some implementations, the instructions can be implemented as modules, such as software modules. As shown in FIG. 3, the apparatus can include: an invalidity determining module 31 configured to determine, when detecting a touch point in a display area on a touch screen, whether the touch point is within a set invalid touch area; and an invalidity processing module 32 configured to control, if it is determined that the touch point is within the invalid touch area, to make no response to the touch point.

In some implementations, the apparatus further includes an invalidity setting module 30 configured to set in advance an invalid touch area with a display area on the touch screen.

In some implementations, the invalidity setting module 30 is configured to set in advance an invalid touch area with respect to an area of the touch screen that displays a predetermined image.

In some implementations, the invalidity setting module 30 is further configured to set in advance an area that is away from edges of the touch screen by a specified width as an invalid touch area with respect to an area of the touch screen that displays a predetermined image.

In some implementations, the invalidity setting module 30 is further configured to set in advance an area that has a specified length and width from a specified position as an invalid touch area with respect to an area of the touch screen that displays a predetermined image.

In some implementations, the invalidity determining module 31 is further configured to determine, when the touch screen displays the predetermined image, whether the touch point is within the invalid touch area that is set in advance with respect to the area of the touch screen that displays the predetermined image.

In some implementations, the invalidity processing module 32 is further configured to control, when the touch screen displays the predetermined image and when it is determined that the touch point is within the invalid touch area that is set in advance with respect to the area of the touch screen that displays the predetermined image, not to trigger a function corresponding to the invalid touch area.

Reference may be made to the description of the method for preventing an accidental touch operation in FIG. 2 and its variations for similar functions implemented by each module in the touch screen device, and will not be repeated herein.

Figure 4:
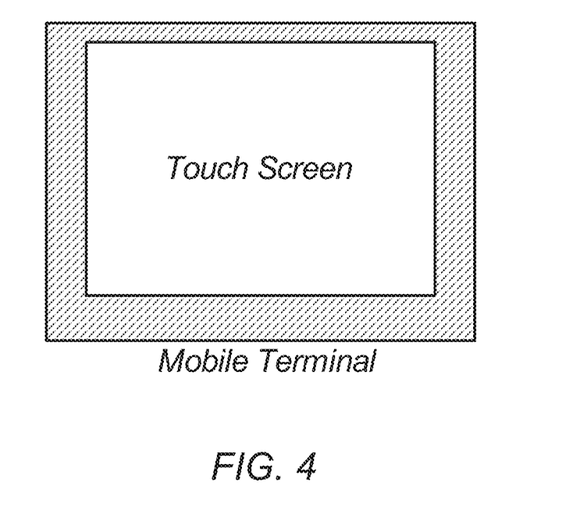
FIG. 4 is a schematic diagram of a mobile terminal according to an implementation of the present disclosure.

Another implementation provides a mobile terminal. As shown in FIG. 4, the mobile terminal can include an apparatus such as the touch screen device described above in FIG. 3. Reference may be made to the specific structure and implementation process of the touch screen device in FIG. 3 and its variations for similar functions of the touch screen device in the mobile terminal, and will not be repeated herein.

In some implementations, the mobile terminal may be any mobile electronic device having a touch screen, such as a mobile phone, a portable computer, a tablet computer, and an onboard computer. For example, the mobile terminal can be a mobile phone.

In some examples, when a mobile phone has a touch screen that adopts the method for preventing an accidental touch operation, the mobile phone may avoid the problem of accidental screen operation under any circumstance, especially when the mobile phone becomes thinner and thinner, a user is likely to accidentally touch an area at edges of the touch screen when holding a frame of the mobile phone, thereby triggering a corresponding function.

Figure 5:
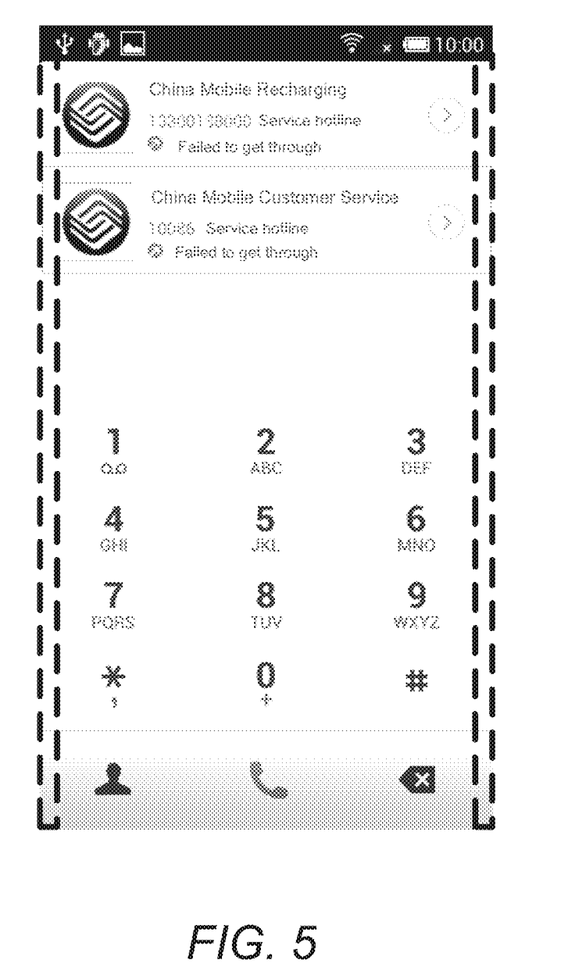
FIG. 5 is a schematic view of invalid touch areas set for a call record interface according to an implementation of the present disclosure.

FIG. 5 is a schematic view of invalid touch areas set for a call record interface according to an implementation of the present disclosure. The implementation describes in detail the method and apparatus for preventing an accidental touch operation provided by the present disclosure. In the implementation, a process of setting an invalid touch area for a call record interface of a mobile phone is as follows.

In a Step A, when a touch screen of a mobile phone displays a call record interface, the invalidity setting module is started; then, the touch screen displays a setup menu, and attribute values of an invalid touch area are set in the setup menu. For example, a width value of the invalid touch area can be set as 20 pixels from the edges of the touch screen. In another example, the invalid touch area can be set only for the left and right edges among the four edges (top, bottom, left, and right) of the touch screen.

As shown in the example in FIG. 5, dashed-line areas are the invalid touch areas that are set with respect to the call record interface in this step. For example, the areas can be located on the left and right of the touch screen, and are about 20 pixels away from the edges of the touch screen.

In this implementation, by default, when the invalidity setting module is initiated in any graphic interface, the set invalid touch area can be provided with respect to the graphic interface. In addition, a user may also start, in a main setup menu of a system, the invalidity setting module for graphic interfaces corresponding to different functions, and set corresponding invalid touch areas.

In a Step B, the invalidity determining module is started. When it is determined that the mobile phone displays the call record interface, it can be determined whether a touch point is within the invalid touch area that is set in step A. If the touch point is within the invalid touch are that is set in step A, step C is executed.

In a Step C, the invalidity processing module is started and the touch point within the invalid touch area is controlled not to respond to the touch operation, that is, not to trigger a corresponding call function.

In this implementation, the invalidity processing module associates the invalid touch area determined in step A with the call record interface, and sets that when the touch screen displays the call record interface, the touch point that occurs within the invalid touch area does not respond to the touch operation, that is, does not trigger a corresponding call function. Therefore, when the invalidity determining module starts the invalidity processing module according to a detection result, the mobile phone used by the user has the corresponding function of preventing a touch. For example, in cases that a frame of the mobile phone is thin, although the user is likely to touch the call record interface at the edges of the touch screen when holding the frame of the mobile phone, the call function will not be triggered, thereby avoiding the problem of an accidental touch.

Correspondingly, in the implementation, an invalid touch area may also be set with respect to other graphic interfaces, such as a mobile phone short message interface, and a contact interface.

In addition, in step A of the implementation, after the invalidity setting module is started, another type of setup menu may also be displayed, which specifically is: setting coordinates (by default, coordinates of the lower left corner of the invalid touch area) where an invalid touch area is located, and setting length and width values of the invalid touch area.

Alternatively, in step A of the implementation, after the invalidity setting module is started, a specific invalid touch area may also be determined by dragging a rectangular icon.

It should be understood to those of ordinary skill in the art that the implementations of the present disclosure may be presented as methods, systems or computer program products. Accordingly, the present disclosure may take the form of an entirely hardware implementation, an entirely software implementation, or an implementation combining hardware and software. Moreover, the present disclosure can take the form of a computer program product which may be implemented on one or more computer usable storage media (including, but not limited to, disk storage and optical storage, etc.) in which computer usable program code is contained.

The present disclosure has been described with reference to the flowcharts and/or block diagrams of the method, apparatus, system and computer program product according to the implementations of the present disclosure. It should be understood that each flow and/or block in the flowcharts and/or block diagrams, and a combination of a flow and/or block in the flowcharts and/or block diagrams may be realized by computer program instructions. These computer program instructions may be provided into a general purpose computer, special purpose computer, embedded processor, or processor of other programmable data processing apparatus to produce a machine, so that the apparatus for implementing the functions specified in one or more flows of the flowcharts or in one or more blocks of the block diagrams is generated through the instructions executed by the computer or the processor of other programmable data processing apparatus.

These computer program instructions may also be stored in a computer-readable memory that can direct a computer or other programmable data processing apparatus to work in a specific manner, so that instructions stored in the computer-readable memory generate an article of manufacture including an instruction apparatus. The instruction apparatus implements the functions specified in one or more flows of the flowcharts and/or in one or more blocks of the block diagrams.

These computer program instructions may also be loaded onto a computer or other programmable data processing apparatus, so that a series of operations may be executed on the computer or other programmable apparatus to produce a computer-implemented processing, and thus the instructions executed on the computer or other programmable apparatus provide the steps of realizing the functions specified in the one or more flows of the flowcharts and/or in one or more blocks of the block diagrams.

It will be apparent to those skilled in the art that various modifications and variations can be made in the present disclosure without departing from the scope or spirit of the disclosure. As such, all such modifications and variations are intended to be included within the scope of the present disclosure, provided that they fall within the scope of the claims of the present disclosure and equivalents thereof.

What is claimed is:

1. A method for preventing an accidental touch operation, comprising:

determining a default area that is frequently touched in cases where a touch screen is operated accidentally on the touch screen for each of at least a first graphic interface and a second graphic interface;

in response to initiating one of at least a first graphic interface and a second graphic interface, defining, using a menu, a first invalid touch area as an area associated with the first graphic interface that is frequently touched in cases where the touch screen is operated accidently based on a first set of pixel values input by a user and the default area for the first graphic interface, and a second invalid touch area as an area associated with the second graphic interface that is frequently touched in cases where the touch screen is operated accidently based on a second set of pixel values input by the user and the default area for the second graphic interface;

detecting a touch point in a display area on the touch screen;

detecting which of the first graphic interface and the second graphic interface is displayed;

determining, using a processor, whether the touch point is within the first invalid touch area based on the detected touch point in the display area when the first graphic interface is displayed and is within the second invalid touch area based on the detected touch point in the display area when the second graphic interface is displayed; and making a response to the touch point only based on a determination that the touch point is not within an associated invalid touch area.

2. The method of claim 1, wherein at least one of the first invalid touch area and the second invalid touch area is set within the display area on the touch screen.

3. The method of claim 2, wherein at least one of the first invalid touch area and the second invalid touch area is set with respect to a partial area of the touch screen that displays a predetermined image.

4. The method of claim 3, wherein at least one of the first invalid touch area and the second invalid touch area is set, using the menu, as an area that is located away from edges of the touch screen by a specified width with respect to the area of the touch screen that displays the predetermined image.

5. The method of claim 2, further comprising:
receiving, from a setup menu associated with at least one of the first graphic interface and the second graphic interface, a user input of a specific pixel value as a width value for at least one of the first invalid touch area and the second invalid touch area.

6. The method of claim 2, further comprising:
receiving, from a setup menu associated with at least one of the first graphic interface and the second graphic interface, a user input of specific pixel values as attribute values associated with at least one of the first invalid touch area and the second invalid touch area, wherein the specific pixel values comprise coordinates, a length value, and a width value associated with the at least one of the first invalid touch area and the second invalid touch area.

7. An apparatus comprising:
a memory;
a processor configured to execute instructions stored in the memory to:
in response to initiating one of at least two different graphic interfaces, define, using a menu, an invalid touch area as an area on a display area of a touch screen that is frequently touched in cases where the touch screen is operated accidently based on a set of pixel values input by a user and a default area for the one of at least two different graphic interfaces;
associate the invalid touch area with the one of at least two different graphic interfaces;
detect a touch point in a display area on a touch screen associated with the apparatus;

determine whether the touch point is within the invalid touch area of the one of at least two different graphic interfaces displayed at the time of the touch point; and
make a response to the touch point only based on a determination that the touch point is not within the one of at least two different graphic interfaces displayed at the time of the touch point.

8. The apparatus of claim 7, wherein the processor is further configured to set the invalid touch area of the one of at least two different graphic interfaces within the display area on the touch screen.

9. The apparatus of claim 8, wherein the processor is further configured to set the invalid touch area of the one of at least two different graphic interfaces with respect to an area of the touch screen that displays a predetermined image.

10. The apparatus of claim 9, wherein the processor is configured to set the invalid touch area of the one of at least two different graphic interfaces with respect to an area of the touch screen that displays a predetermined image by: setting, using the menu, the invalid touch area of the one of at least two different graphic interfaces as an area that is located away from edges of the touch screen by a specified width with respect to the area of the touch screen that displays the predetermined image.

11. The apparatus of claim 8, wherein the processor is further configured to set, based on a user input of a specific pixel value as a width value on a setup menu of the one of at least two different graphic interfaces, the invalid touch area away from the edges of the touch screen by the width value.

12. A non-transitory computer-readable medium having stored thereon a program of instructions executable by a computing device, to cause the computing device to:
in response to initiating a displayed graphic interface of at least two different graphic interfaces, define, using a menu and based on a set of pixel values input by a user and a default are for the displayed graphic interface of at least two different graphic interfaces, an area on a display area of a touch screen that is frequently touched in cases where the touch screen is operated accidently, as an invalid touch area associated with the displayed graphic interface, wherein one invalid touch area is defined for a respective graphic interface;
detect, for the displayed graphic interface, a touch point in the display area on the touch screen associated with the computer device and determine the displayed graphic interface;
determine whether the touch point is within the invalid touch area associated with the displayed graphic interface; and
make a response to the touch point only based on a determination that the touch point is not within the invalid touch area associated with the displayed graphic interface, wherein each invalid touch area is different depending on the respective graphic interface.

13. The non-transitory computer-readable medium of claim 12, wherein the instructions further include instructions to set the invalid touch area associated with the displayed graphic interface within the display area on the touch screen.

14. The non-transitory computer-readable medium of claim 13, wherein the instructions further include instructions to set the invalid touch area associated with the displayed graphic interface with respect to an area of the touch screen that displays a predetermined image within the graphic interface.

15. The non-transitory computer-readable medium of claim 14, wherein the instructions to set the invalid touch area associated with the displayed graphic interface with respect to an area of the touch screen that displays the predetermined image include instructions to set, using the menu, the invalid touch area associated with the displayed graphic interface as an area that is located away from edges of the touch screen by a specified width with respect to the area of the touch screen that displays the predetermined image.

16. The non-transitory computer-readable medium of claim 13, wherein the instructions include instructions to set, using the menu, the invalid touch area associated with the displayed graphic interface away from edges of the touch screen by a width value based on a user input of a specific pixel value as the width value.

17. The non-transitory computer-readable medium of claim 14, wherein the instructions include instructions to determine, using the menu, the invalid touch area associated with the displayed graphic interface based on a user input of specific pixel values including a length value and a width value.

* * * * *